April 14, 1936.   H. A. COLLARD   2,037,499
FUEL TANK CLOSING CAP
Filed March 4, 1935    2 Sheets-Sheet 1
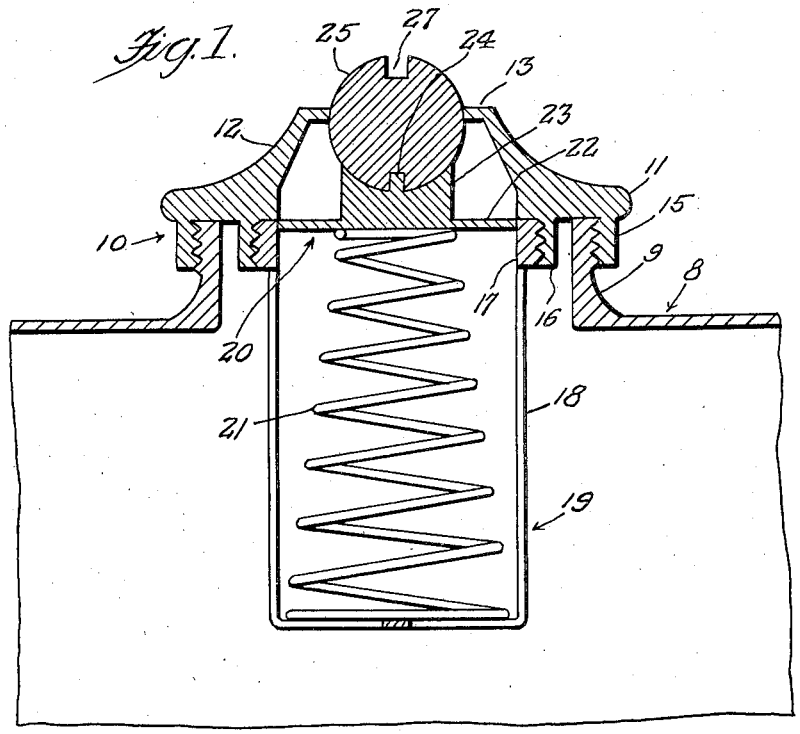
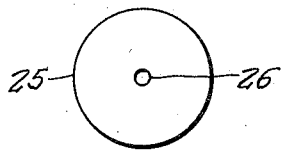
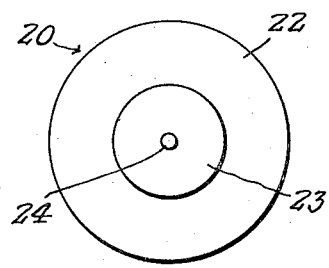
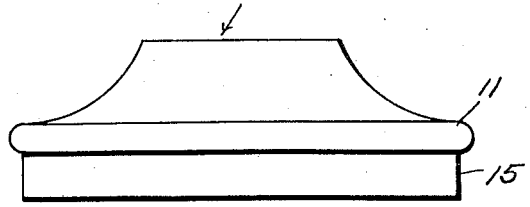
Inventor
HenryA.Collard,
By *Clarence A. O'Brien*
Attorney April 14, 1936.   H. A. COLLARD   2,037,499
FUEL TANK CLOSING CAP
Filed March 4, 1935    2 Sheets-Sheet 2
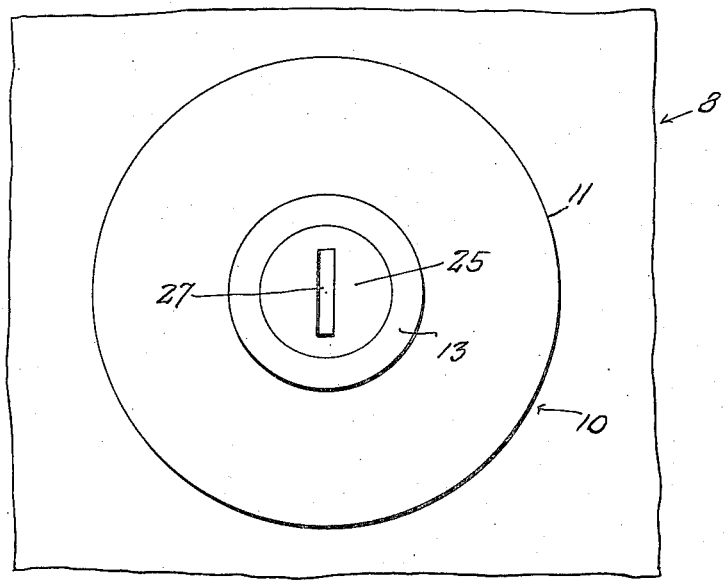
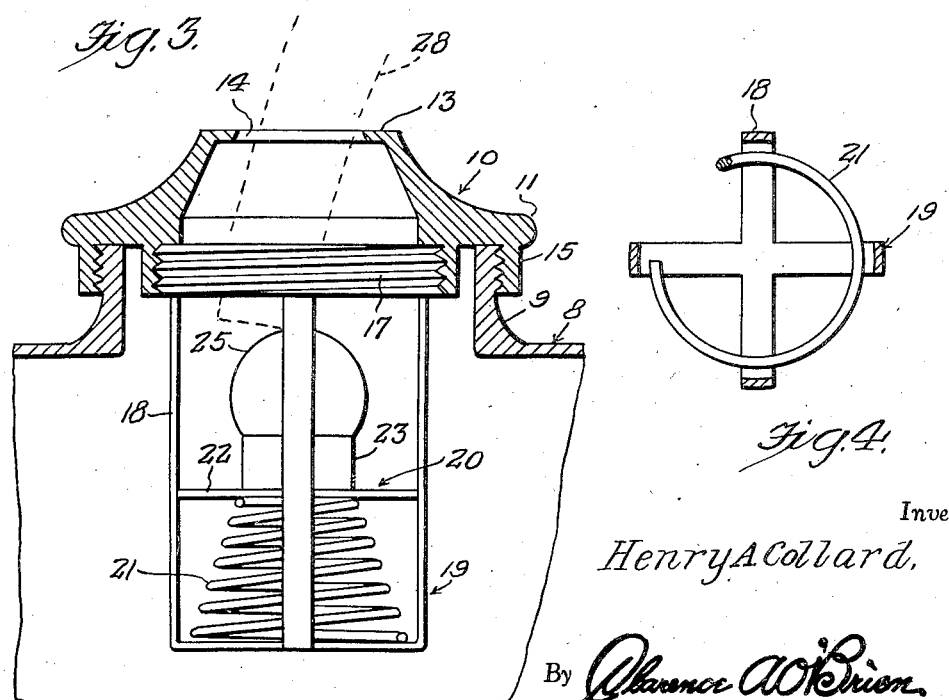
Inventor
Henry A Collard,
By *Clarence A O'Brien*
Attorney Patented Apr. 14, 1936

2,037,499

UNITED STATES PATENT OFFICE 2,037,499

FUEL TANK CLOSING CAP

Henry A. Collard, Windsor, Vt.

Application March 4, 1935, Serial No. 9,307

6 Claims. (Cl. 220—24)

This invention relates to the broad class of automotive accessories and appliances and has more specific reference to closures for fuel tanks such as are employed on present day automobiles and the like, and in particular relates to what may be generally referred to as a novel closing cap.

Admittedly, there are numerous types and varied forms of fuel tank caps now in vogue in the prior art as well as in the trade. As a general proposition, however, the most simple type screw cap is universally endorsed and is nothing more than a disk like cap provided with a screw threaded flange or rim to releasably engage a screw threaded neck of the tank by way of which the pump nozzle is inserted for filling the tank.

It is a matter of common knowledge though, that the one great disadvantage of this simple type cap is that it is frequently displaced or that the attendant fails to put it back on and this results in obvious inconveniences. It is evident, therefore, that there is need for a tank closure which is ingeniously adapted to fulfill the requirements of an article of this class while at the same time maintaining the requisites of simplicity and economy.

After due deliberation and consideration, I have perfected a tank closing cap of a form hitherto unequalled and characterized by thoroughly practical and up to date achievements possessing surpassing merits in that it embraces the indispensable features of simplicity, economy, efficiency and practical facility from a standpoint of installation and expeditious use.

In reducing the invention to practice, I have evolved and produced a structural coordination of parts dominated by a new type screw cap having a depending cage housing a spring pressed ball check valve cooperable with the filler hole in the cap in such a manner as to provide an effective and dependable closure while at the same time allowing insertion of the hose nozzle for unhampered filling purposes.

Other features and advantages may become apparent from the following description and accompanying drawings:

In the drawings:

Figure 1 is a fragmentary sectional view showing a portion of a conventional fuel tank provided with a cap and complemental parts constructed in accordance with the principles of the present invention.

Figure 2 is a top plan view of Figure 1, the parts being in elevation.

Figure 3 is a view similar to Figure 1 showing the manner in which the ball check valve is depressed against the spring to allow for insertion of the hose nozzle.

Figure 4 is a horizontal section through the spring adaptation cage.

Figure 5 is an edge view of the cap per se.

Figure 6 is a top plan view of the follower unit.

Figure 7 is a bottom plan view of the ball valve.

Referring now to the drawings and in particular to Figure 1, it will be noted that the fuel tank is denoted by the numeral 8 and that this is provided with the customary screw threaded filler neck 9. The cap per se, which is threadedly connected therewith is indicated at 10 and this comprises a disk-like body 11 formed centrally with a hollow adapter or riser 12 terminating in an inturned flange 13 which defines the beveled edge filler hole or valve seat 14 (see Figure 3). On the bottom of the cap I provide radially spaced screw threaded flanges, the outer one of which may be designated as a rim 15 and this is attached to the filler neck, and the inner one 16 of which is defined as a suspension annulus. This is internally screw threaded to accommodate a screw threaded or attaching fitting 17 formed on the upper ends of the uprights 18 of the open work or skeleton cage 19. This cage 19 is designed to depend into the interior of the tank as shown in Figures 1 and 3 and it is intended to accommodate a novel follower unit 20 and a companion expansion spring 21. The spring is located in the cage and bears against the disk-like follower 22. The follower is provided with a central boss 23 which has a concavity of part-spherical form and at the center of this concavity is a short stud 24 which may be designated as a keeper. The cavity serves as a seat for the correspondingly shaped portion of the ball check valve 25 and this is provided in its bottom with a socket 26 which serves as a keeper to receive the pin or stud 24 and to maintain the valve assembled in the cavity. The valve is proportioned to protrude slightly through the filler opening 14 when it is closed as shown in Figure 1. Moreover, its peripheral surface bears tightly against the beveled valve seat 14 to effect a tight closure. Then too, it is provided in its top with a kerf 27 which is designed to accommodate an edge portion of the nozzle 28 in the manner shown in Figure 3. In other words, the nozzle is angled and one edge portion thereof is fitted into the kerf so as to satisfactorily depress the valve to open position against the tension of spring 21 as depicted in Figure 3. Thus the ball valve serves as a baffle allowing the gasoline or fuel to be flushed into the tank so that there will be no impediment in the flow. The open work cage also cooperates in allowing the gas to flow freely into the tank when the valve is open. It is evident therefore that the cap as a general rule is permanently connected with the neck on the tank so that the parts assume the operative relationship depicted in Figures 1 and 3. Thereafter, the ball valve 25 constitutes the means for controlling the placement of fuel in the tank. As I visualize this device in contrast with the prior art structures with which I am familiar, I consider it somewhat of an innovation. It is sufficiently unique as to command recognition and endorsement in the trade. Possessing the features and advantages heretofore related at the introductory portion of the description, and also possessing other requisites not necessary to enumerate, it is believed that the succeeding claims effectively portray the structural novelty which exists.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. As a component part of a structure of the class described, a spring actuated follower unit comprising a disk having a central boss provided with a cavity of part-spherical form, said cavity having a central pin constituting a keeper element.

2. In a structure of the class described, a screw cap having inner and outer screw threaded flanges and a central filler opening forming a valve seat, an open work cage having a screw threaded fitting attached to said inner flange, a spring in said cage, a follower unit in said cage cooperable with the spring, a ball check valve cooperable with said follower, said parts being separably related in the manner and for the purposes described.

3. A filler cap for fuel tank comprising a cap provided with an attaching rim and having a central filler opening whose edge portion is fashioned to provide a seat for a ball check valve, a spring pressed follower unit comprising a disk having a central boss provided with a cavity of part-spherical form, said cavity having a central retention stud constituting a keeper element, a guiding and retention cage on said cap for said follower unit, and a ball check valve interposed between the follower unit and valve seat, said ball check valve having its lower portion seated in said cavity and formed with a socket removably receiving said keeper element, the upper portion of said valve being projectable through and beyond the opening in the cap and provided with a notch to accommodate the nozzle of the fuel hose.

4. As a component part of a structural assemblage of the class described, a spring-actuated follower unit comprising a disk having a central boss provided with a cavity of part-spherical form, said cavity having a central upstanding pin constituting a keeper stud, a ball check valve fashioned to fit in said cavity having a socket to accommodate said stud, the diametrically opposed portion of said check valve being formed with means to receive the edge portion of the nozzle of the customary hose to facilitate depressible actuation of the valve.

5. In a fuel tank closing cap construction of the class described, a circular type cap adapted to be connected with the customary screw threaded attaching and filler neck on a fuel tank, comprising a disc like body having a depending marginal internally screw threaded flange, having a central raised frusto-conical portion, the truncated apex thereof being centrally apertured to provide a filler hole and a valve seat, said body being provided radially inward of said marginal flange with a second depending screw threaded flange disposed in concentric relationship, that portion of the body immediately inward of said second-named flange being flattened to provide annular stop shoulder, and a valved closure unit including a valve cooperable with said seat and a valve guide including a screw threaded collar for detachable connection to said second-named screw threaded flange.

6. As a component part of a fuel tank closure structure of the class described, a vertical elongated open work spring accommodation and guide cage, such cage being provided at its upper end with an outstanding screw-threaded annular attaching collar, a follower disc mounted for reciprocation in said cage, a coiled spring mounted in the cage and bearing against the bottom of the cage, as well as against said follower disc, and valve means supported on said follower disc.

HENRY A. COLLARD.